United States Patent [19]
Rhodes et al.

[11] 3,965,561
[45] June 29, 1976

[54] MACHINE FOR PLACING SUBSTANTIALLY FLAT, OPEN-THROATED ELEMENTS ON RODS

[75] Inventors: Tony Rhodes, Torrance; Derek John Gay, Palos Verdes Peninsula, both of Calif.

[73] Assignee: Mattel, Inc., Hawthorne, Calif.

[22] Filed: Feb. 24, 1975

[21] Appl. No.: 552,587

[52] U.S. Cl. ............................ 29/211 R; 29/208 R; 29/229
[51] Int. Cl.² ......................................... B23Q 7/10
[58] Field of Search .......... 29/211 R, 211 D, 208 R, 29/208 C, 229, 200 R, 235; 193/43; 198/33

[56] References Cited
UNITED STATES PATENTS

| | | |
|---|---|---|
| 2,837,812 | 6/1958 | Erdmann .......................... 29/211 R |
| 2,930,114 | 3/1960 | Erdmann .......................... 29/211 R |
| 3,052,969 | 9/1962 | Loven ............................... 29/211 R |
| 3,138,854 | 6/1964 | Erdmann .......................... 29/211 R |
| 3,266,133 | 8/1966 | Kalbow ............................ 29/211 R |
| 3,300,845 | 1/1967 | Knight et al. .................... 29/211 R |
| 3,448,507 | 6/1969 | Jackson et al. .................. 29/229 X |

*Primary Examiner*—Victor A. DiPalma
*Attorney, Agent, or Firm*—Max E. Shirk; Stephen L. King; John G. Mesaros

[57] ABSTRACT

Machine places substantially flat, open-throated elements on rods by passing open-throat portions of the elements past the rods transversely to the major axes thereof. Elements and rods are automatically moved from storage areas to assembly areas.

11 Claims, 17 Drawing Figures

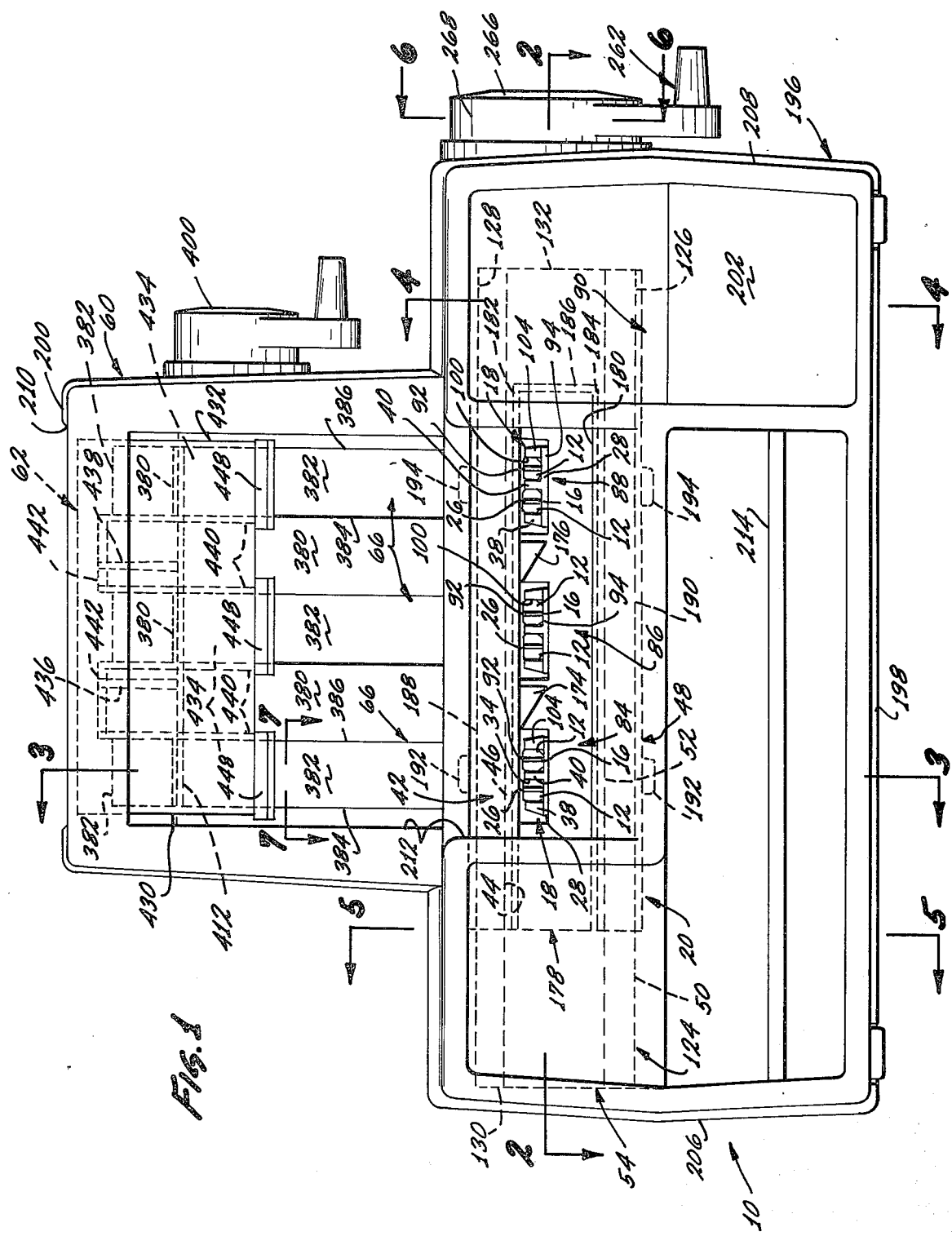

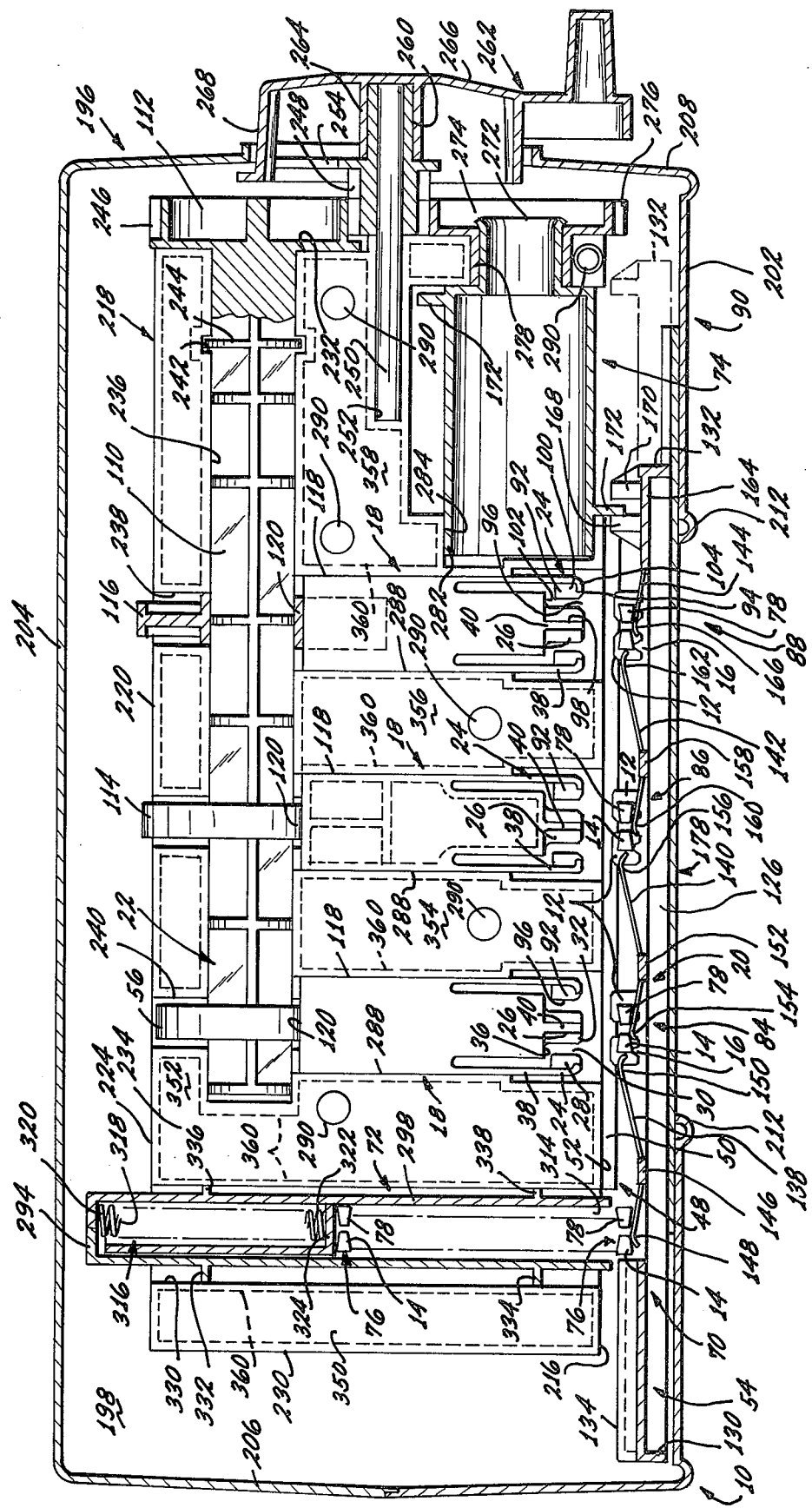

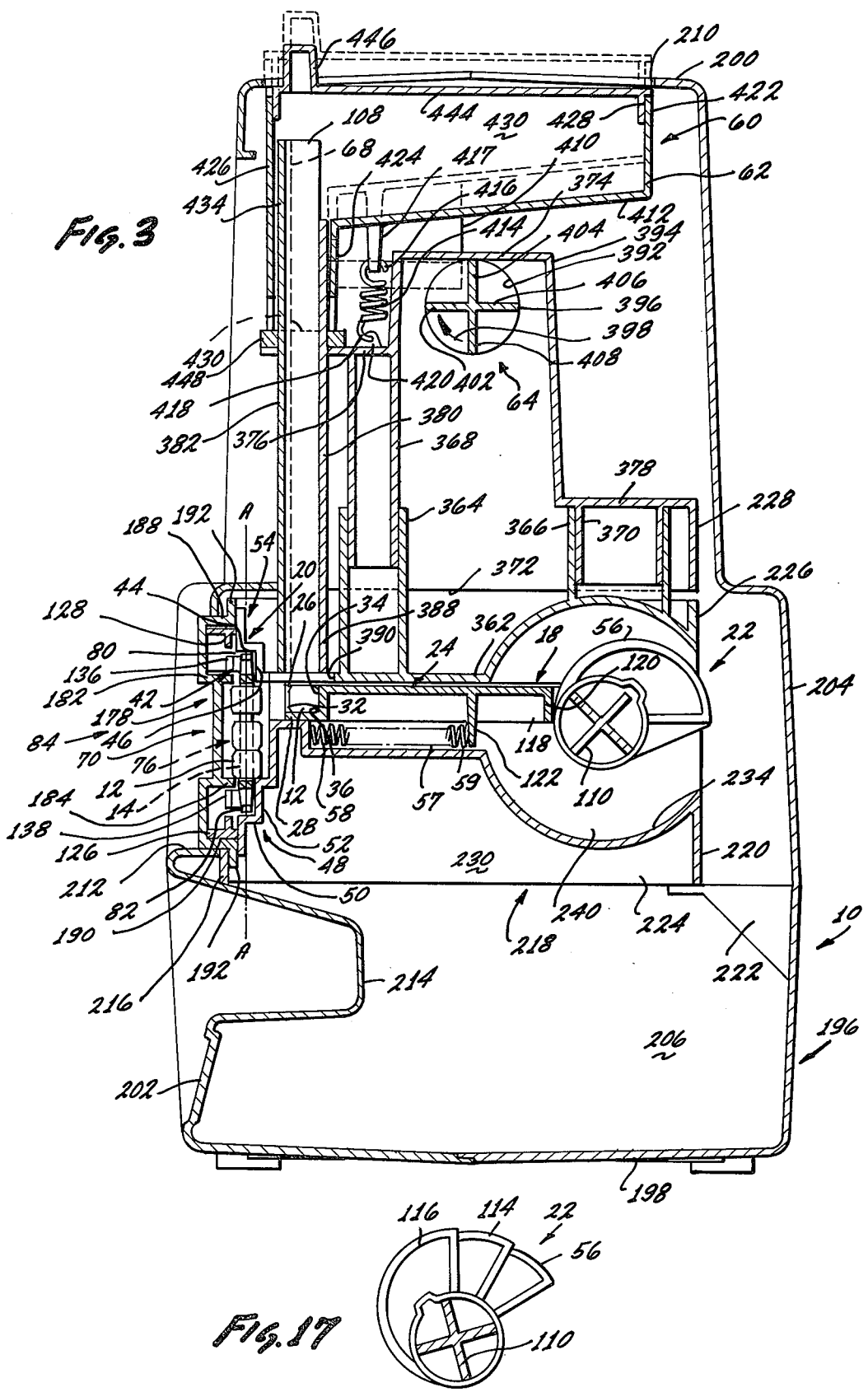

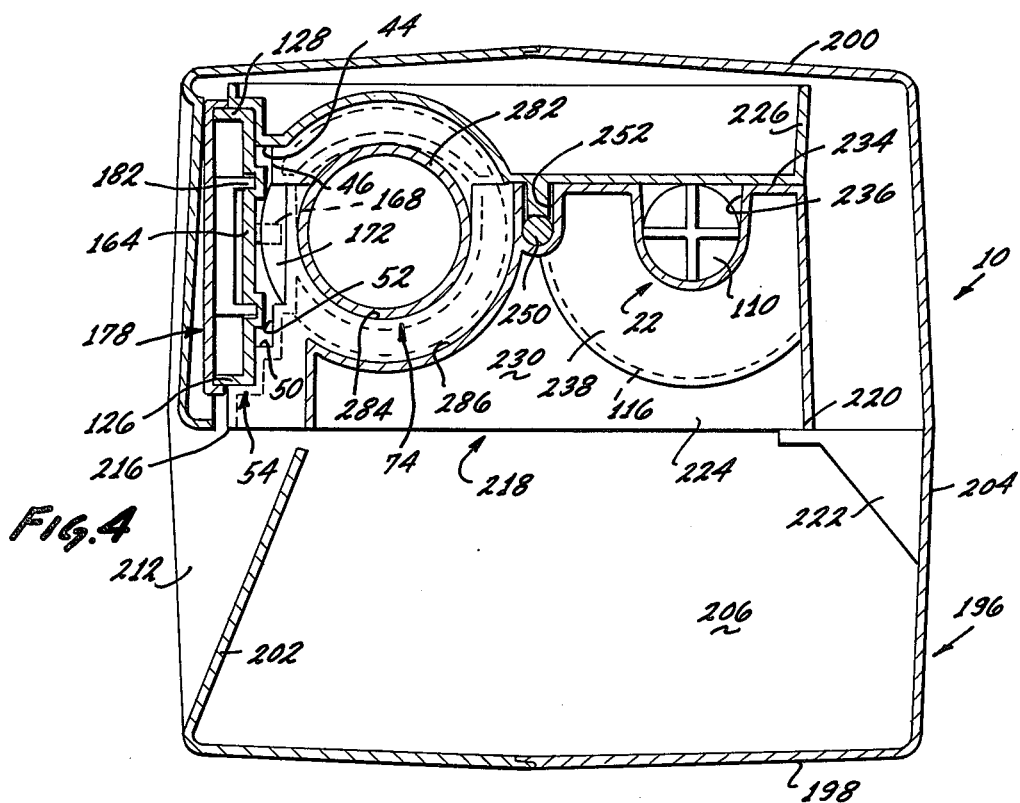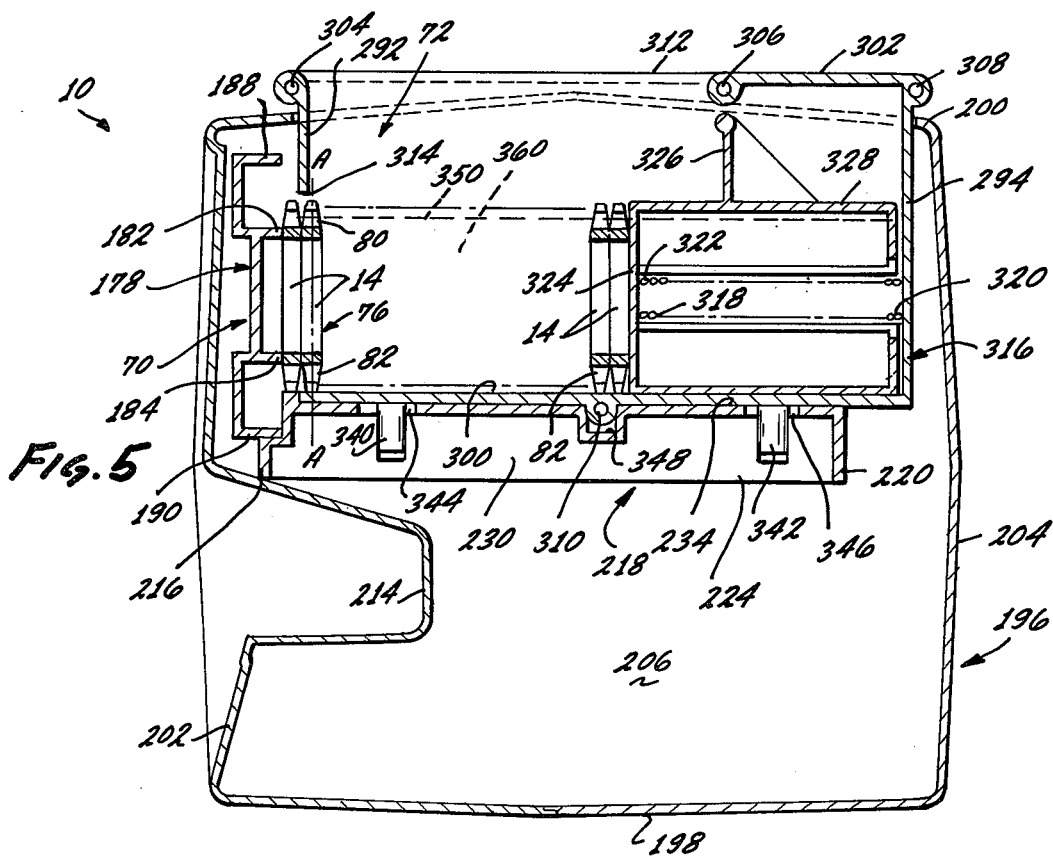

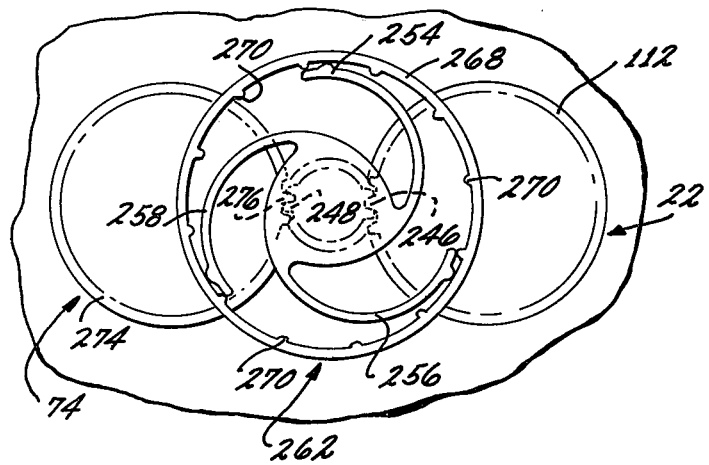
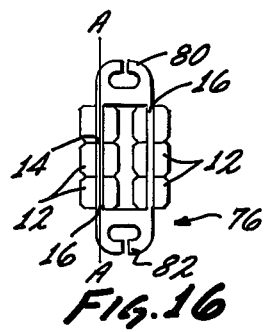
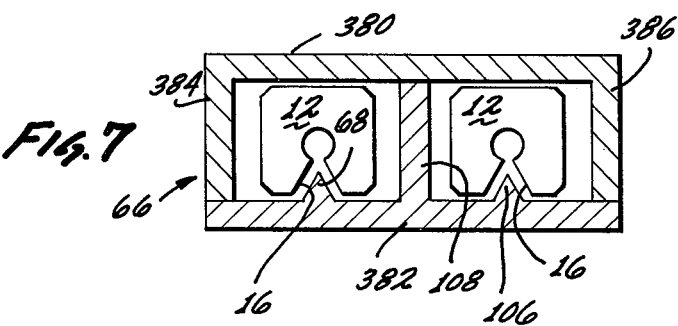
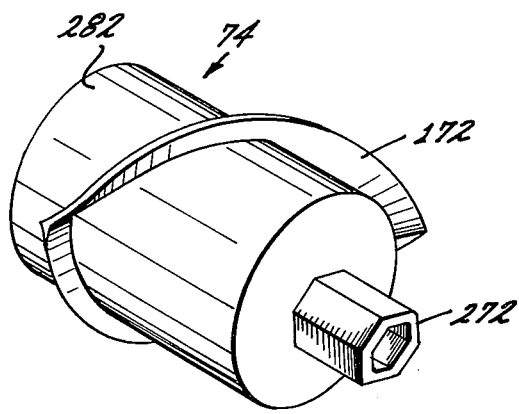
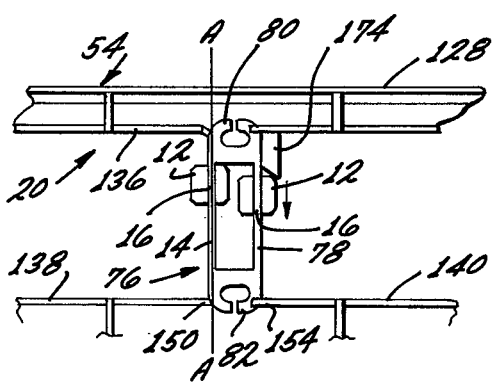

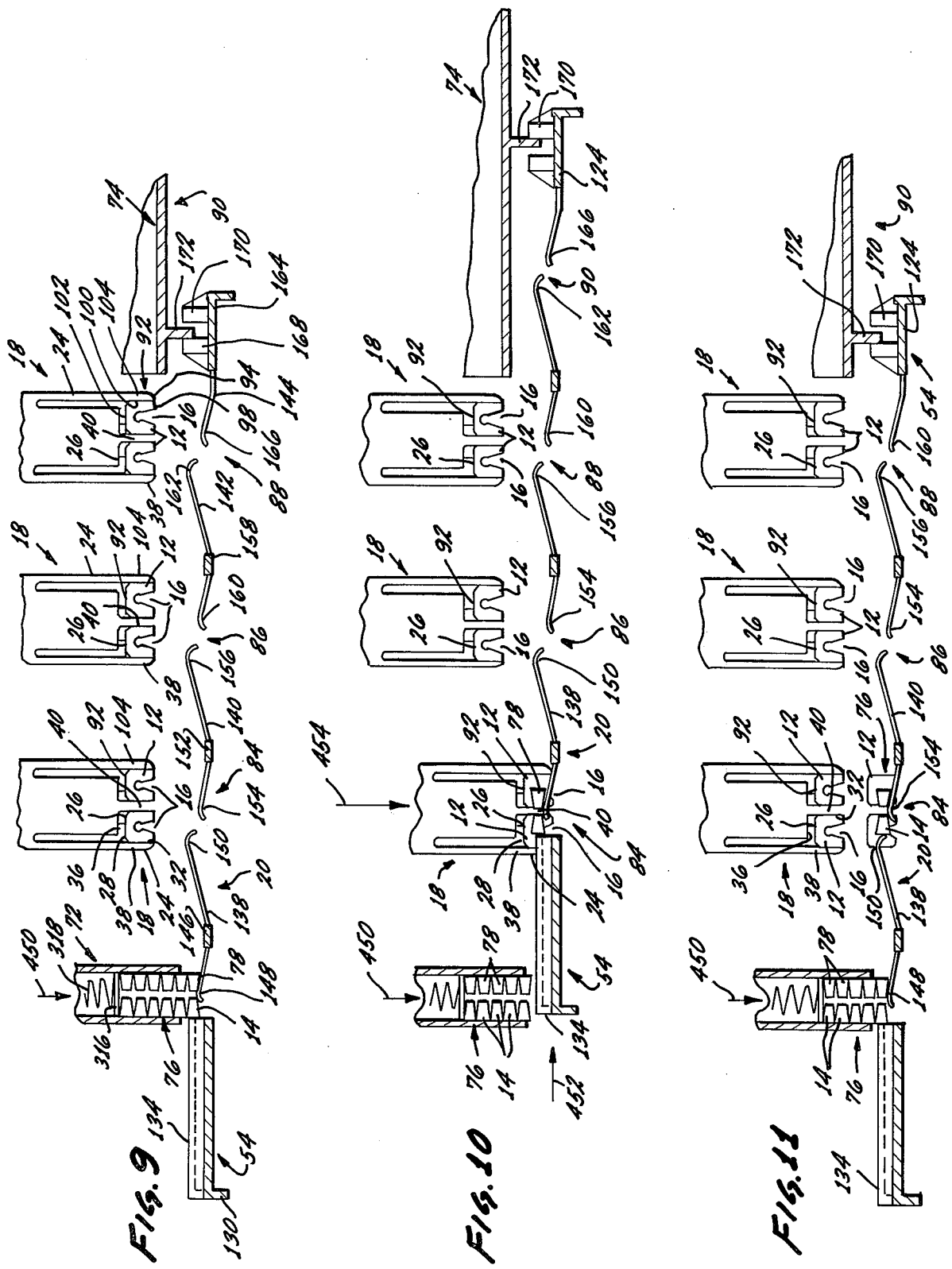

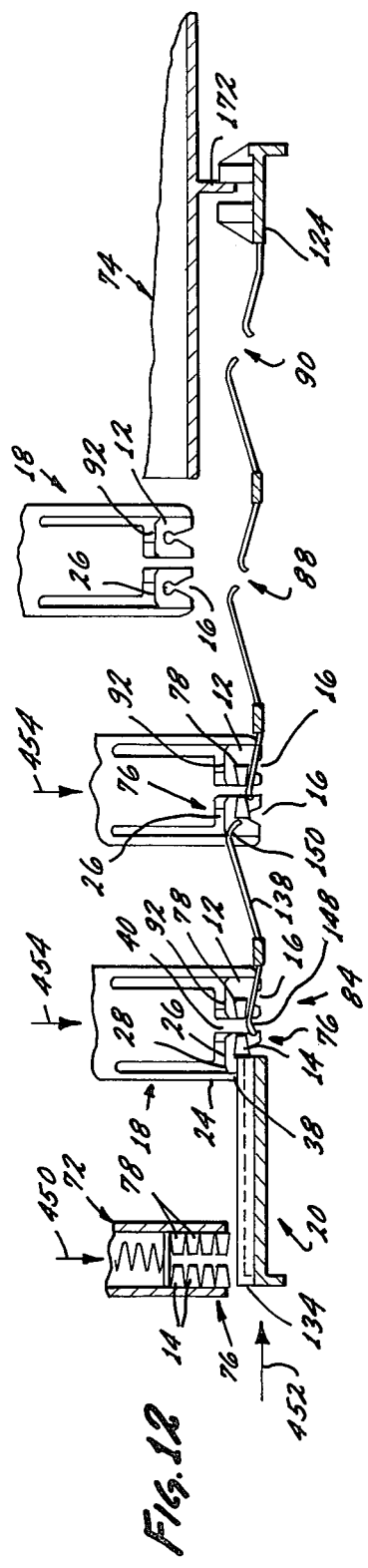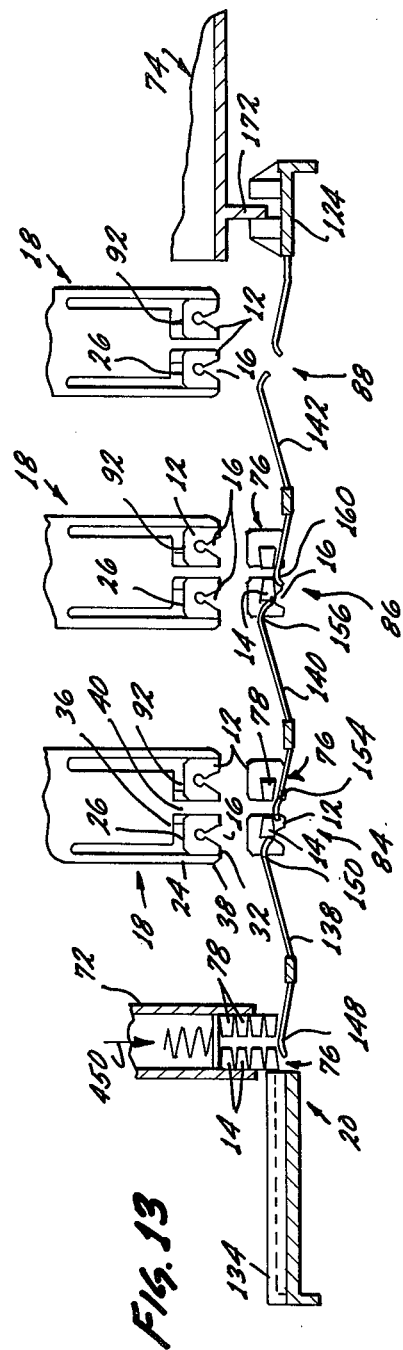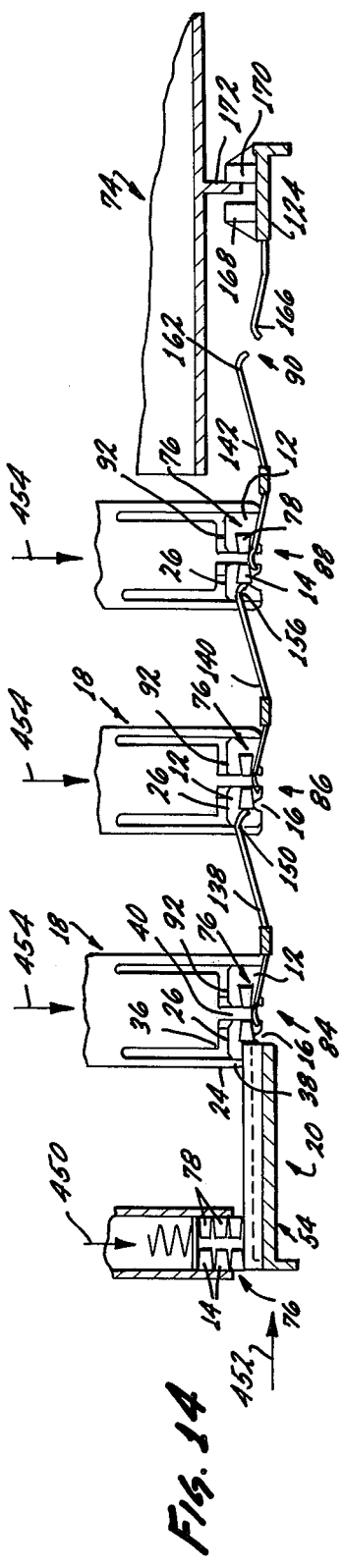

3,965,561

MACHINE FOR PLACING SUBSTANTIALLY FLAT, OPEN-THROATED ELEMENTS ON RODS

BACKGROUND OF THE INVENTION

The background of the invention will be set forth in two parts.

1. Field of the Invention

The present invention pertains generally to machines for placing substantially flat, open-throated elements on rods and more particularly to an inexpensive machine toy or craft item which may be used by a child or a hobbyist to place C-shaped beads or the like on clips having parallel rods.

2. Description of the Prior Art

The prior art known to applicants is listed by way of illustration, but not of limitation, in separate communications to the United States Patent Office.

The present invention exemplifies improvements over this prior art.

OBJECTS AND SUMMARY OF THE INVENTION

It is a primary object of the present invention to provide a new and useful machine for placing substantially flat, open-throated elements on rods.

It is another object of the present invention to provide a machine of the type described which is simple and inexpensive so that it may be used as a toy by a child or as a craft item by a hobbyist to place C-shaped beads or the like on clips having parallel rods.

According to the present invention, a machine is provided for placing a substantially flat, open-throated element on a rod by passing the open-throat portion of the element past the rod transversely to the major axis thereof.

The machine is an inexpensive toy or craft item made primarily from suitable plastic materials and may be used by a child or a hobbyist to place C-shaped beads or the like on clips having parallel rods.

The machine includes means for holding an open-throated element with its open-throat portion unobstructed, means for supporting a rod with its major axis adjacent the unobstructed open-throat portion of the element and means connected to the holding means for moving the holding means toward the supported rod a sufficient distance to pass the open-throat portion of the held element past the rod.

The holding means may comprise a shoe having a pocket provided therein. The pocket has a bottom wall with a slot provided therein, an open front portion, an open top portion, a rear wall and a pair of side walls so that an element may be dropped through the open top portion and positioned in the pocket with the open-throat portion in the open front portion of the pocket. The rod is accommodated in the slot when the shoe is moved toward the rod for placing an element thereon. At least one of the pocket side walls may be flexible so that it will yield laterally to permit the element to move out through the open front portion of the pocket when the shoe is moved away from the rod after the element has been positioned thereon.

The means for supporting the rod with its major axis adjacent the unobstructed open-throat portion of the element may comprise a first L-shaped way positioned above the holding means and a second L-shaped way positioned below the holding means. Each way has a horizontal leg and a vertical leg and the supporting means includes resilient pawl means pressing the rod against the vertical legs.

The means for moving the holding means toward the supported rod a sufficient distance to pass the open-throat portion of the held element past the rod may comprise a cam means engageable with the holding means for pushing it toward the rod and a return spring connected to the holding means for biasing it into engagement with the cam means.

The machine may also include means for automatically feeding the elements to the holding means. These feeding means may comprise hopper means for storing a supply of the elements, agitator means connected to the hopper means for agitating the elements and chute means placing the hopper means in communication with the holding means. The chute means includes means for placing the open-throat portions of the elements in a proper orientation with the holding means so that the open-throat portions will be unobstructed.

The machine may also include means for automatically supplying the rods to the supporting means. This supply means may comprise a suitable magazine means for storing a supply of rods adjacent the holding means and incrementing cam means connected to the resilient pawl means for reciprocating it.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 1 is a front elevational view of a machine constituting a presently preferred embodiment of the invention;

FIG. 2 is an enlarged, cross-sectional view taken along line 2—2 of FIG. 1;

FIG. 3 is an enlarged, cross-sectional view taken along line 3—3 of FIG. 1;

FIG. 4 is an enlarged, cross-sectional view taken along line 4—4 of FIG. 1;

FIG. 5 is an enlarged, cross-sectional view taken along line 5—5 of FIG. 1;

FIG. 6 is an enlarged, cross-sectional view taken along line 6—6 of FIG. 1;

FIG. 7 is an enlarged, cross-sectional view taken along line 7—7 of FIG. 1;

FIG. 8 is an enlarged, perspective of an incrementing cam shown in assembled relationship in the FIG. 2 view of the machine of FIG. 1;

FIGS. 9–14 are schematic views showing the step-by-step operation of the machine of the present invention;

FIG. 15 is an elevational view showing a fixed cam means for moving assembled elements downwardly on a rod;

FIG. 16 is an elevational view of a bead and clip assembly which may be assembled by using the machine of the present invention; and FIG. 17 is a somewhat schematic view showing the relationship of three feed cams used in the machine of the present invention.

DESCRIPTION OF THE PREFERRED EMBODIMENT

Referring again to the drawings, and more particularly to FIGS. 1–3, a machine constituting a presently preferred embodiment of the invention, generally designated 10, may be used for placing a substantially flat, open-throated element 12 on a rod 14 by passing the open-throat portion 16 of element 12 past rod 14 transversely to the major axis A—A thereof.

The machine includes suitable holding means 18 for holding an element 12 with its open-throat portion 16 unobstructed, support means 20 for supporting rod 14 with its major axis A—A adjacent the unobstructed open-throat portion 16 of element 12 and moving means 22 connected to the holding means 20 for moving the holding means 20 toward the supported rod 14 a sufficient distance to pass the open-throat portion 16 of the held element 12 past rod 14.

Holding means 18 may comprise a feed shoe 24 having a pocket 26 provided therein. Pocket 26 has a bottom wall 28 with a slot 30 provided therein, an open front portion 32, an open top portion 34, a rear wall 36 and a pair of side walls 38, 40. Element 12 may be dropped through the open top portion 34 and positioned in pocket 26 with the open-throat portion 16 in open front portion 32 of pocket 26. Slot 30 accommodates rod 14 when feed shoe 24 is moved toward rod 14. As best seen in FIG. 2, side wall 38 is fairly long and thin and may be made from a suitable flexible plastic material so that it will yield laterally to permit element 12 to move out through open front portion 32 when feed shoe 24 is moved away from rod 14 after element 12 has been positioned thereon.

Supporting means 20 includes a first L-shaped way 42 positioned above holding means 18. Way 42 includes a first leg 44 lying in a substantially horizontal plane and a second leg 46 depending from the first leg 44 normal thereto in a vertical plane behind rod 14. Supporting means 20 may also comprise a second L-shaped way 48 positioned below holding means 18. Way 48 has a first leg 50 lying in a substantially horizontal plane and a second leg 52 upstanding from the first leg 50 normal thereto in a vertical plane behind rod 14. Supporting means 20 additionally comprises resilient pawl means 54 pressing rod 14 against the second legs 46, 52.

Moving means 22 may comprise a cam means 56 engageable with holding means 18 for pushing it toward rod 14 and a return spring 57 (FIG. 3) having a first end 58 engaging a fixed housing member and a second end 59 engaging feed shoe 24.

Machine 10 may also include feeding means 60 for automatically feeding elements 12 to holding means 18. Feeding means 60 comprises a hopper means 62, for storing a supply of elements 12; agitator means 64, connected to hopper means 62 for agitating elements 12 and chute means 66, placing hopper means 62 in communication with holding means 18. Chute means 66 includes vertical rib means 68 for placing the open-throat portion 16 of elements 12 in a proper orientation with respect to holding means 18 so that the open-throat portion 16 will be unobstructed.

Machine 10 may also include supply means 70 for automatically supplying rods 14 to supporting means 20. Supply means 70 may comprise suitable magazine means 72 for storing a supply of rods 14 adjacent holding means 18; resilient pawl means 54 reciprocably mounted between magazine means 72 and holding means 18 for moving rods 14 from magazine means 72 to holding means 18 when resilient pawl means 54 is reciprocated and incrementing cam means 74 connected to resilient pawl means 54 for reciprocating it.

Referring now to FIGS. 15 and 16, rod 14 is shown herein for purposes of illustration, but not of limitation, as forming part of a bead clip assembly 76 having a second rod 78 and a pair of C-shaped link-engaging ends 80, 82 formed integrally with rod 14 from a suitable plastic material. Link-engaging ends 80, 82 may engage suitable links (not shown) used to join a plurality of bead clip assemblies 76 together. Elements 12 may comprise colored beads. Machine 10 is adapted to simultaneously install a bead 12 on each rod 14, 78 at a first station 84 (FIG. 1), move bead clip assembly 76 to a second station 86 where a second bead 12 will be installed on each rod 14, 78, move bead clip assembly 76 to a third station 88 where a third bead 12 will be installed on each rod 14, 78 and then move clip assembly 76 to a discharge station 90 where bead clip assembly 76 drops from machine 10.

As best seen in FIGS. 1 and 2, a holding means 18 is provided at each of the stations 84, 86 and 88. Each holding means 18 not only includes the feed shoe 24 and pocket 26 heretofore described, but also includes a second pocket 92 so that an element 12 may be installed on each rod 14, 78 simultaneously. Each second pocket 92 includes a bottom wall 94 having a slot 96 provided therein, an open front portion 98, an open top portion 100, a rear wall portion 102 and a flexible side wall 104. Side wall 40 is common to pockets 26, 92. A chute means 66 is also provided at each station 86, 88. Each chute means 66 communicates with hopper means 62 and not only includes vertical rib means 68, as heretofore described for the chute means 66 at station 84, but also includes a second vertical rib means 106 (FIG. 7) and a central partition 108 so that each chute means 66 will feed two beads 12 to holding means 18 at each of the stations 84, 86 and 88. One bead in each chute means 66 will be fed to pocket 26 and the other bead will be fed to the second pocket 92.

Referring now to FIGS. 2, 3 and 17, moving means 22 may be molded from a suitable plastic material and includes a unitary cam shaft 110, cam shaft gear 112, the cam means 56 at station 84, a second cam means 114 at station 86 and a third cam means 116 at station 88. Each holding means 18 includes a rear portion 118 having a depending rear wall 120 and an intermediate depending finger 122. As best seen in FIG. 2, cam means 56 engages rear wall 120 on the holding means 18 at station 84, cam means 114 engages rear wall 120 on holding means 18 at station 86 and cam means 116 engages rear wall 120 on holding means 18 at station 88. A spring like the spring 57 shown in FIG. 3 for station 84 engages a depending finger 122 on each holding means 188 to bias it into engagement with its associated cam means 56, 114, 116. It will be understood by those skilled in the art that less cranking torque will be required to rotate cam shaft 110 if cam means 56, 114 and 116 do not simultaneously install a pair of beads on a bead clip assembly 76 at each station 84, 86, 88. Accordingly, as best seen in FIG. 17, a suitable phase angle (30° for example) is maintained between cam means 56, 114, 116.

Referring now to FIGS. 1–4 and 15, resilient pawl means 54 includes a frame 124 having a bottom rail 126, a top rail 128 and end rails 130, 132. Resilient pawl means 54 also includes a first pusher member 134 (FIG. 2) which pushes bead clip assembly 76 from clip magazine 72 station 84, first upper and lower resilient pawls 136, 138, second upper and lower resilient pawls like the lower pawl shown at 140, third upper and lower pawls like the lower pawl shown at 142 and fourth upper and lower pawls like the lower pawl shown at 144. Each pawl 136, 138 is connected to frame 124 by a bracket 146 (FIG. 2) and includes a first end 148 adapted to maintain clip assembly 76 in an upright position in magazine 72 and during travel from magazine 72 to station 84 and a second end 150 adapted to push clip assembly from station 84 to station 86. Pawl 140 is connected to frame 124 by a bracket 152 and includes a first end 154 adapted to maintain clip assembly 76 in an upright position at station 84 and during travel to station 86 and a second end 156 adapted to push clip assembly 76 from station 86 to station 88. Pawl 142 is connected to frame 124 by a bracket 158 and includes a first end 160 adapted to maintain clip assembly 76 in an upright position at station 86 and during travel from station 86 to station 88 and a second end 162 adapted to push clip assembly 76 from station 88 to station 90. Pawl 144 is connected to frame 124 by a bracket 164 and includes a free end 166 adapted to maintain clip assembly 76 in an upright position at station 88 and during travel to station 90. Bracket 164 carries a pair of spaced clips 168, 170 capturing a cam member 172 provided on incrementing cam 74 for reciprocating frame 124 to move clip assembly 76 from magazine 72 to stations 84, 86, 88 and 90.

It will be apparent from FIG. 3 that each feed shoe 24 places its beads 12 on the upper end of clip assembly 76. Therefore, it is necessary to move beads 12 downwardly on clip assembly 76 during travel from one station to another so that the upper ends of clip assembly 76 will be open to additional beads at stations 86 and 88. Beads 12 on the upper end of a clip assembly 76 moving from station 84 to station 86 are moved downwardly by a first ramp 174 (FIGS. 1 and 15). A second ramp 176 is provided between stations 86 and 88 (FIG. 1) for moving beads 12 downwardly on clip assembly 76 as it travels from station 86 to station 88.

Referring now to FIGS. 1–5, carrier frame 124 is maintained in position on machine 10 by a plate 178 which may be made from a transparent plastic material, if desired. Plate 178 is provided with an opening 180 (FIG. 1) bordered by inwardly-extending, upper and lower ribs 182, 184, respectively, and by an inwardly-extending end rib 186. Plate 178 is provided with an inwardly-extending upper flange 188 and an inwardly-extending lower flange 190 from each of which a pair of tabs 192, 194 extend for connecting plate 178 to machine 10. As best seen in FIG. 3, upper flange 188 and upper rib 182 serve as a channel for upper rail 128 and the upper pawls on carrier 124 and lower rib 184 and lower flange 190 form a channel for lower rail 126 and the lower pawls on carrier 124.

Machine 10 includes an outer housing assembly 196 having a bottom wall 198, a top wall 200, a front wall 202, a rear wall 204, a first end wall 206 and a second end wall 208. Top wall 200 is provided with an opening 210 providing access to hopper assembly 62. Front wall 202 is provided with an opening 212 exposing chutes 66 and transparent plate 178. Housing assembly 196 may be molded from a suitable plastic material. During the molding operation, front wall 202 may be provided with a rearwardly extending member 214 providing a support for the front wall 216 of an inner housing assembly 218. Inner housing assembly 218 includes a rear wall 220 supported by a bracket 222 affixed to rear wall 204 of outer housing assembly 196.

As best seen in FIG. 3, inner housing assembly 218 includes a lower portion 224, an intermediate portion 226 and an upper portion 228. The lower portion 224 is provided with the front wall 216 and includes end walls 230, 232 and a top wall 234. The lower portion 224 of inner housing assembly 218 may be molded from a suitable plastic material so that pockets, channels and the like may be formed in top wall 234 for accommodating most of the moving parts heretofore described. For example, top wall 234 is provided with a channel 236 having a U-shaped cross-section (FIG. 4) for accommodating cam shaft 110. Suitable pockets, like the one shown at 238 in FIG. 4 and the one shown at 240 in FIG. 3, are provided along channel 236 for accommodating cams 56, 114 and 116. Channel 236 is provided with an annular undercut portion 242 (FIG. 2) for trapping a thrust washer 244 formed on cam shaft 110 during the molding operation. Cam shaft gear 112 may also be formed on cam shaft 110 during the molding operation and includes teeth 246 drivingly engaged by an input pinion 248 affixed to a shaft 250 rotatably mounted in a channel 252 formed in top wall 234 during the molding operation. Input pinion 248 may also be molded from a suitable plastic material and is integrally formed with ratchet fingers 254, 256 and 258 and with a hub 260. A crank assembly 262 is rotatably mounted on hub 260 by a cylindrical boss 264 carried by a cup-like member 266 having an encompassing side wall 268 provided with internal teeth 270. Ratchet fingers 254, 256 and 258 coact with teeth 270 (FIG. 6) in such a manner that crank assembly 262 will slip with respect to the fingers if the crank is turned backward and will slip when the crank is subjected to an overload during rotation in its operating (forward) direction.

Referring now to FIG. 8, incrementing cam 74 carries a non-circular shaft 272. This shaft receives a gear 274 (FIG. 2) having teeth 276 drivingly engaged by input pinion 248 so that crank assembly 262 will also rotate incrementing cam 74. Gear 274 includes a cylindrical hub portion 278 journalled in a suitable bearing 280 formed in top wall 234. Cam 74 includes a rear, cylindrical portion 282 journalled in a U-shaped bearing 284 (FIG. 4) formed in top wall 234. Top wall 234 is also provided with a pocket 286 which accommodates cam 172 on incrementing cam 74.

Top wall 234 is also provided with suitable channels 288 for holding means 18. The intermediate portion 226 of inner housing assembly 218 prevents the operating parts on top wall 234 from becoming dislodged and is secured to top wall 234 by suitable fastening means (not shown) which engage the apertures 290 (FIG. 2) provided in top wall 234.

Referring now to FIGS. 2 and 5, clip magazine assembly 72 includes a front wall 292, a rear wall 294, side walls 296, 298, a bottom wall 300 and a top wall 302. Magazine 72 may be molded in two halves which may then be joined together by suitable pins (not shown) which may be engaged in hollow, cylindrical bosses 304, 306, 308 provided on top wall 302 and a hollow cylindrical boss 310 provided on bottom wall 300. Top wall 302 is provided with an opening 312 through which clip assembly 76 may be inserted into magazine 72. Additionally, front wall 292 is provided with an opening 314 through which clip assembly 76 are discharged from magazine 72 by a spring-loaded plunger 316. Plunger 316 is reciprocably mounted in magazine 72 and is biased toward opening 314 by a compression spring 318 having a rear end 320 engaging rear wall 294 of magazine 72 and a front end 322 engaging the front wall 324 of plunger 316. A handle 326 is affixed to top wall 328 of plunger 316 to facilitate retracting it to the position shown in FIG. 5 so that clip assembly 76 may be loaded into magazine 72 through opening 312. Magazine 72 is mounted in a channel 330 provided in top wall 234 of lower housing portion 224. Magazine 72 is retained in position in channel 330 by a first pair of spacers 332, 334 provided on side wall 296, a second pair of spacers 336, 338 provided on side wall 298 and a pair of flexible tabs 340, 342 extending through slots 344, 346, respectively, provided in top wall 234. A U-shaped depression 348 is provided in top wall 234 to accommodate cylindrical boss 310. It may be noted at this point that the channels for magazine 72 and holding means 18 are formed in top wall 234 by providing upstanding islands 350, 352, 354, 356 and 358, respectively, each having a depending encompassing side wall 360.

Referring now to FIGS. 1, 3 and 7, the intermediate portion 226 of inner housing assembly 218 includes a top wall 362 from which hollow, cylindrical bosses 364, 366 extend upwardly into engagement with complementary bosses 368, 370 depending from upper housing portion 228 for connecting housing portions 226 and 228 together. The upper portion 228 of inner housing 218 includes an encompassing side wall 372, an upper top wall 374, an intermediate top wall 376 and a lower top wall 378. The upper portion 228 of inner housing 218 also includes a front wall 380 which is also the rear wall of each chute means 66.

Thus, each chute means 66 includes rear wall 380, the partition 108 previously described, a front wall 382, a first end wall 384 and a second end wall 386. Each chute means 66 also includes an open lower end 388 extending below side wall 372 into communication with an opening 390 provided in top wall 362 above the pockets 26 in feed shoes 24. A bore 392 is provided in the upper end 394 of the upper portion 228 of inner housing 218 for journalling a crankshaft 396 forming part of the agitator means 64. Crankshaft 396 may be rotated in the direction of arrow 398 (FIG. 3) by a crank 400 (FIG. 1) causing flutes 402, 404, 406 and 408 on crankshaft 396 to cyclically engage a gusset plate 410 depending from the bottom wall portion 412 of hopper means 62 for moving it upwardly against the bias of a spring 414 having an upper hooked end 416 engaged in a slot 417 provided in gusset plate 410 and a lower hooked end 418 engaged in an eyelet 420 provided on intermediate top wall 376. Hopper means 62 includes an upper rear wall 422, a lower rear wall 424, a front wall 426, an open top 428 and side walls 430, 432. Lower rear wall 424 and front wall 426 telescopically engage the upper end 434 of each chute means 66 so that spring 414, crankshaft 396 and gusset plate 410 will reciprocate hopper means 62 when crankshaft 396 is rotated in the direction of arrow 398. This will agitate beads 12 causing them to move into chute means 66.

Hopper means 62 may be divided into three compartments by vertical partitions 436, 438 (FIG. 1) so that a separate supply of beads 12 may be available for each chute means 66. Additionally, vertical plates 440 may be secured to front wall 426 and lower rear wall 424 normal thereto in sliding engagement with those sides of chute means 66 not engaged by side walls 430, 432. The upper ends of each pair of vertical plates 440 may be tied together with a horizontal plate 442. The open top 428 of hopper means 62 may be closed with a lid 444 having a handle 446 provided thereon. An elastomeric stop 448 encompasses each chute means 66 and is supported by an extension of intermediate top wall 376 for limiting the amount of downward travel which may be imparted to hopper means 62 by spring 414.

The loading of machine 10 will now be described in connection with FIGS. 1, 3, 5 and 7. Plunger 316 may be moved to the position shown in FIG. 5 compressing spring 318. A plurality of clip assemblies 76 may then be inserted into magazine 72 through its open top 312 and placed in an upright position in front of plunger 316 which may then be released to push a first clip assembly 76 through opening 314 and into engagement with flanges 182, 184.

Lid 444 may then be removed from hopper means 62 and each compartment therein may be filled with beads 12. Lid 444 may then be replaced to keep beads 12 from bouncing out of hopper means 62 when it is agitated by rotating crankshaft 396 in the direction of arrow 398 to cyclically engage gusset plate 410 with flutes 402, 404, 406 and 408 causing hopper means 62 to be cyclically elevated against the force of spring 414 to the position shown in broken lines in FIG. 3 and returned by spring 414 to the position shown in solid lines in FIG. 3. This agitates the beads in hopper means 62 and moves them into chute means 66 in the orientation shown in FIG. 7. The lowermost beads in chute means 66 will drop through opening 390 and into the pockets 26 in feed shoes 24.

Operation of machine 10 will now be described in connection with FIGS. 2 and 9–14. FIG. 9 shows the relative positions of the parts after the machine has been loaded as just described. It will be noted that spring 318 and plunger 316 move bead clip assemblies 76 in the direction of arrow 450 until the leading bead clip assembly 76 bottoms-out against end 148 of pawl 138 adjacent pusher 134.

Crank assembly 262 (FIG. 2) may then be rotated for imparting rotation to incrementing cam 74 and cams 56, 114 and 116. This will cause cam 172 to move incrementing carrier frame 124 to the right in the direction of arrow 452 (FIG. 10) so that pusher 134 will move the bottomed-out clip assembly 76 to station 84. By this time, cam 56 (FIG. 2) will have moved the station 84 feed shoe 24 in the direction of arrow 454 (FIG. 10) a sufficient distance to engage rods 14, 78 with beads 12.

Continued rotation of crank assembly 262 wiol permit cam return springs 57 to return feed shoes 24 to the positions shown in FIG. 11 while cam 172 moves incrementing carrier frame 124 to the left, as viewed in FIG. 11, until end 148 of pawl 138 and pusher 134 are again in front of magazine 72 and end 150 of pawl 138 engages the clip assembly 76 at station 84 while end 154 of pawl 140 maintains clip assembly 76 in an upright position at station 84.

Continued rotation of crank 262 again moves incrementing carrier frame 124 in the direction of arrow 452 (FIG. 12) so that pusher 134 will move another bead clip assembly 76 from magazine 72 to station 84 while end 150 of pawl 138 simultaneously moves the first bead clip assembly 76 past ramp 174 (FIG. 15) causing the beads installed on rods 14 and 78 at station 84 to be moved downwardly sufficiently that a second pair of beads 12 may be installed on rods 14, 78 at station 86. By the time the first bead clip assembly 76 arrives at station 86 and the second bead clip assembly 76 arrives at station 84, cams 56 and 14 will have moved their associated feed shoes 24 in the direction of arrow 454 a sufficient distance to deposit their beads 12 on clip assemblies 76.

Further rotation of crank 262 will move the parts to the relative positions shown in FIG. 13 where pusher 134 and end 148 of pawl 138 are again in front to magazine assembly 72, end 150 of pawl 138 is in position to push the clip assembly 76 being held at station 84 by end 154 of pawl 140 and end 156 of pawl 140 is in position to push the station 86 clip assembly 76 to station 88 while end 160 of pawl 142 maintains the station 86 clip assembly 76 in an upright position.

The next increment of rotation of crank 262 moves the parts to the relative positions shown in FIG. 14 for moving a third clip assembly 76 into position at station 84 while the first clip assembly 76 was moved to station 88 and the second clip assembly 76 was moved to station 86. During this movement, ramps 174 and 176 (FIG. 1) moved beads 12 downwardly on rods 14, 78. While cam 172 is moving incrementing carrier frame 124 in the direction of arrow 452 to the position shown in FIG. 14, cams 56, 114 and 116 (FIG. 2) will be moving their associated feed shoes in the direction of arrow 454 for depositing additional beads on clip assemblies 76 at stations 84, 86 and 88.

It will be appreciated by those skilled in the art that upon the next cycle of operation of crank 262, end 162 of pawl 142 will push a fully-loaded clip assembly 76 from station 88 to discharge station 90 where the clip assembly will leave machine 10.

While the particular machine for placing substantially flat, open-throated elements on rods herein shown and described in detail is fully capable of attaining the objects and providing the advantages hereinbefore stated, it is to be understood that it is merely illustrative of the presently-preferred embodiment of the invention and that no limitations are intended to the details of construction or design herein shown other than as defined in the appended claims which form a part of this disclosure.

Whenever the term "means" is employed in these claims, this term is to be interpreted an defining the corresponding structure illustrated and described in this specification or the equivalent of the same.

What is claimed is:

1. A machine for placing a substantially flat, open-throated element on a rod by passing the open-throat portion of said element past said rod transversely to the major axis thereof, comprising:
   1. means for holding said element with its open-throat portion unobstructed;
   2. means for supporting said rod with its major axis adjacent said unobstructed open-throat portion of said element, said supporting means comprising:
      A. a first L-shaped way positioned above said holding means, said first L-shaped way having a first leg lying in a substantially horizontal plane and a second leg depending from said first leg normal thereto in a vertical plane behind said rod;
      B. a second L-shaped way positioned below said holding means, said second L-shaped way having a first leg lying in a horizontal plane and a second leg upstanding from said first leg of said second L-shaped way normal thereto in a vertical plane behind said rod; and
      C. resilient pawl means pressing said rod against said second legs; and
   3. means connected to said holding means for moving said holding means toward said supported rod a sufficient distance to pass said open-throat portion of said held element past said rod.

2. A machine for placing a substantially flat, open-throated element on a rod by passing the open-throat portion of said element past said rod transversely to the major axis thereof, comprising:
   1. means for holding said element with its open-throat portion unobstructed;
   2. means for supporting said rod with its major axis adjacent said unobstructed open-throat portion of said element:
   3. means connected to said holding means for moving said holding means toward said supported rod a sufficient distance to pass said open-throat portion of said held element past said rod; and
   4. means for automatically supplying said rods to said supporting means, said supply means comprising:
      A. magazine means for storing a supply of said rods adjacent said holding means;
      B. resilient pawl means reciprocably mounted between said magazine means and said holding means for moving said rods from said magazine means to said holding means when said resilient pawl means is reciprocated; and
      C. incrementing cam means connected to said resilient pawl means for reciprocating it.

3. A machine for placing a plurality of substantially flat, open-throated elements on a rod by passing the open-throat portions of said elements past the upper end of said rod transversely to the major axis thereof, comprising:
   a first station;
   first means for holding one of said elements with its open-throat portion unobstructed at said first station;
   first means for supporting said rod at said first station with its upper end adjacent said unobstructed open-throat portion of said one of said elements;
   first means connected to said first holding means for moving said first holding means toward said supported rod at said first station a sufficient distance to pass said open-throat portion of said one of said elements past said rod at said upper end;
   a second station adjacent said first station;
   , second means for holding a second of said elements with its open-throat portion unobstructed at said second station;
   second means for supporting said rod at said second station with its upper end adjacent said unobstructed open-throat portion of said second of said elements;
   second means connected to said second holding means for moving said second holding means toward said supported rod at said second station a sufficient distance to pass said open-throat portion of said second of said elements past said rod at said upper end;
   resilient pawl means reciprocably mounted between said stations for moving said rod from said first station to said second station; and
   ramp means mounted between said stations in the path-of-travel of said upper end of said rod for moving said one of said elements away from said upper end during travel of said rod from said first station to said second station, whereby said upper end of said rod will be free to receive said second of said elements at said second station.

4. A machine as stated in claim 3 wherein each of said holding means comprises:
a shoe having a pocket provided therein, said pocket having a bottom wall with a slot provided therein, an open front portion, an open top portion, a rear wall and a pair of side walls, whereby said element may be dropped through said open top portion and positioned in said pocket with said open-throat portion in said open front portion of said pocket, said rod being adapted to travel in said slot in said bottom wall when said shoe is moved toward said rod.

5. A machine as stated in claim 4 wherein at least one of said side walls is flexible and yields laterally to permit said element to move out through said open front portion when said shoe is moved away from said rod after said element has been positioned thereon.

6. A machine as stated in claim 3 wherein each of said supporting means comprises:
a first L-shaped way positioned above said first and second holding means, said first L-shaped way having a first leg lying in a substantially horizontal plane and a second leg depending from said first leg normal thereto in a vertical plane behind said rod; and
a second L-shaped way positioned below said first and second holding means, said second L-shaped way having a first leg lying in a horizontal plane and a second leg upstanding from said first leg of said second L-shaped way normal thereto in a vertical plane behind said rod, said resilient pawl means pressing said rod against said second legs.

7. A machine as stated in claim 3 wherein each of said moving means comprises:
a cam means engageable with an associated one of said holding means for pushing it toward said rod; and
a return spring connected to an associated one of said holding means for biasing it into engagement with its associated cam means.

8. A machine as stated in claim 3 including first and second means for automatically feeding said elements to said first and second holding means, respectively.

9. A machine as stated in claim 8 wherein said first and second feeding means each comprises:
hopper means for storing a supply of said elements;
agitator means connected to said hopper means for agitating said elements; and
chute means placing said hopper means in communication with an associated one of said holding means, said chute means including means for placing said open-throat portions of said elements in a proper orientation with said associated holding means, whereby said open-throat portions will be unobstructed.

10. A machine as stated in claim 3 including means for automatically supplying said rods to said first supporting means.

11. A machine as stated in claim 10 wherein said supply means comprises:
magazine means for storing a supply of said rods adjacent said first holding means;
means mounting said resilient pawl means between said magazine means and said first holding means for moving said rods from said magazine means to said first holding means when said resilient pawl means is reciprocated; and
incrementing cam means connected to said resilient pawl means for reciprocating it.

* * * * *